United States Patent
Matsumoto

(10) Patent No.: US 8,681,385 B2
(45) Date of Patent: Mar. 25, 2014

(54) IMAGE PROCESSING APPARATUS

(75) Inventor: Daisuke Matsumoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 996 days.

(21) Appl. No.: 12/341,411

(22) Filed: Dec. 22, 2008

(65) Prior Publication Data

US 2009/0161171 A1 Jun. 25, 2009

(30) Foreign Application Priority Data

Dec. 25, 2007 (JP) ................................. 2007-332481

(51) Int. Cl.
*H04N 1/407* (2006.01)
*H04N 1/409* (2006.01)

(52) U.S. Cl.
USPC ........... 358/3.26; 358/1.9; 358/2.1; 358/3.02; 358/518; 358/520; 358/521; 382/112

(58) Field of Classification Search
USPC .......... 358/1.9, 2.1, 3.02, 3.26, 518, 520, 521
See application file for complete search history.

(56) References Cited

U.S. PATENT DOCUMENTS

| | | | |
|---|---|---|---|
| 6,281,983 B1 | 8/2001 | Takahashi et al. | |
| 6,333,752 B1 * | 12/2001 | Hasegawa et al. | ............ 715/764 |
| 6,430,320 B1 * | 8/2002 | Jia et al. | ........................ 382/289 |
| 6,839,459 B2 * | 1/2005 | Jia | ................................. 382/154 |
| 7,016,536 B1 * | 3/2006 | Ling et al. | ...................... 382/190 |
| 7,161,691 B2 * | 1/2007 | Nakagiri et al. | ............. 358/1.13 |
| 7,483,564 B2 * | 1/2009 | Jia | ................................. 382/154 |
| 7,889,405 B2 * | 2/2011 | Takami et al. | ................ 358/527 |
| 2005/0074179 A1 * | 4/2005 | Wilensky | ...................... 382/254 |
| 2007/0165285 A1 | 7/2007 | Inada | |
| 2008/0024845 A1 * | 1/2008 | Makino et al. | ................ 358/538 |

FOREIGN PATENT DOCUMENTS

| | | |
|---|---|---|
| JP | 6-217090 A | 8/1994 |
| JP | 9-093378 A | 4/1997 |
| JP | 9-284497 A | 10/1997 |
| JP | 2003-143407 A | 5/2003 |
| JP | 2004-104226 A | 4/2004 |
| JP | 2005-184360 A | 7/2005 |
| JP | 2006-87027 A | 3/2006 |
| JP | 2007-194753 A | 8/2007 |

OTHER PUBLICATIONS

Machine translation of JP2004_104226.*
JP Office Action dtd Aug. 25, 2009, JP Appln. 2007-332481, partial English translation.

* cited by examiner

*Primary Examiner* — Richard Zhu
(74) *Attorney, Agent, or Firm* — Banner & Witcoff, Ltd.

(57) ABSTRACT

An image processing apparatus is provided that includes a scanning unit for scanning a document to obtain scanning data and a control unit. The control unit is configured to specify a shadow region to be modified in the scanning data, execute a first adjusting operation for selecting a gray-scale level of a portion of the scanning data corresponding to the specified shadow region, and modify the scanning data according to the selected gray-scale level.

29 Claims, 13 Drawing Sheets

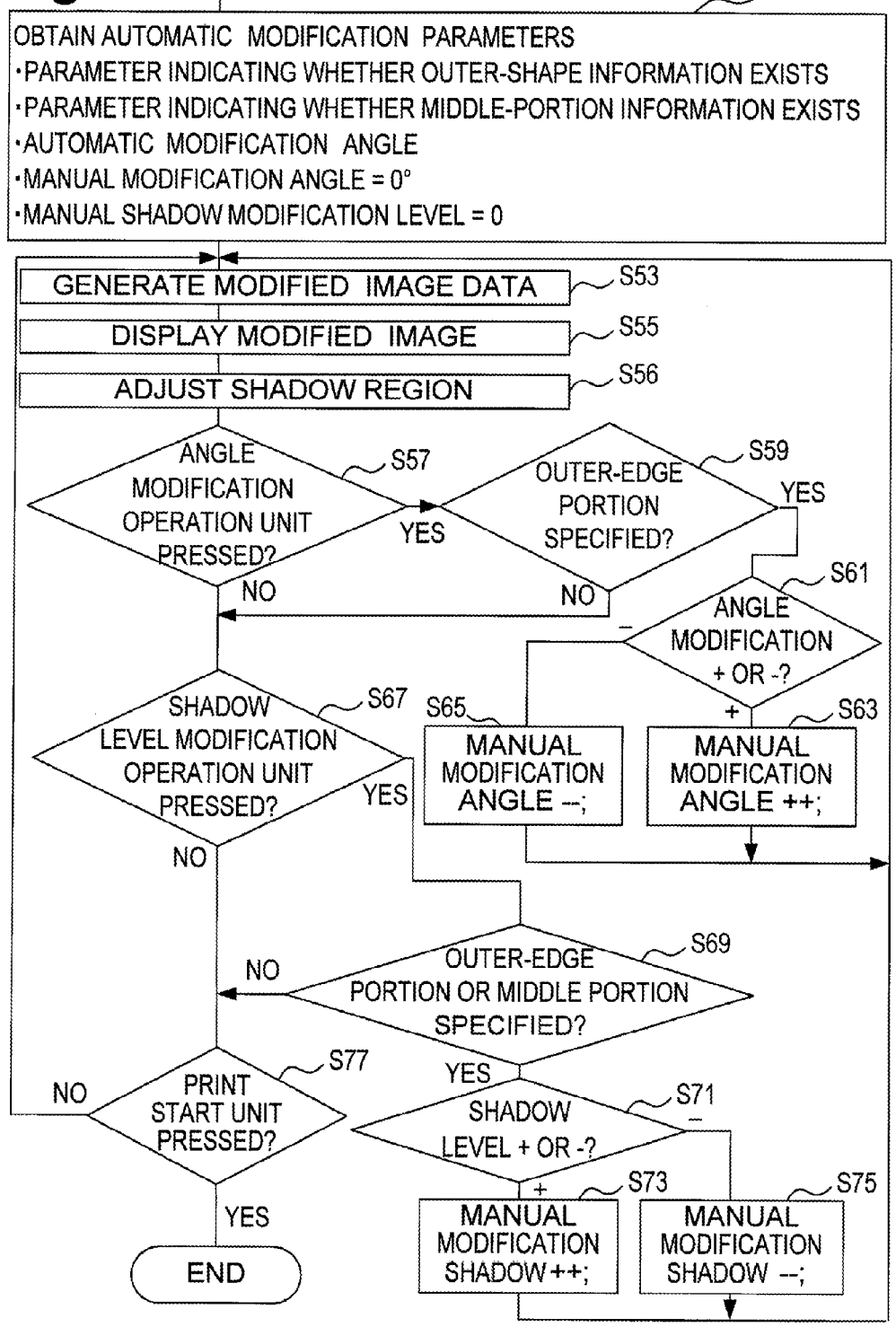

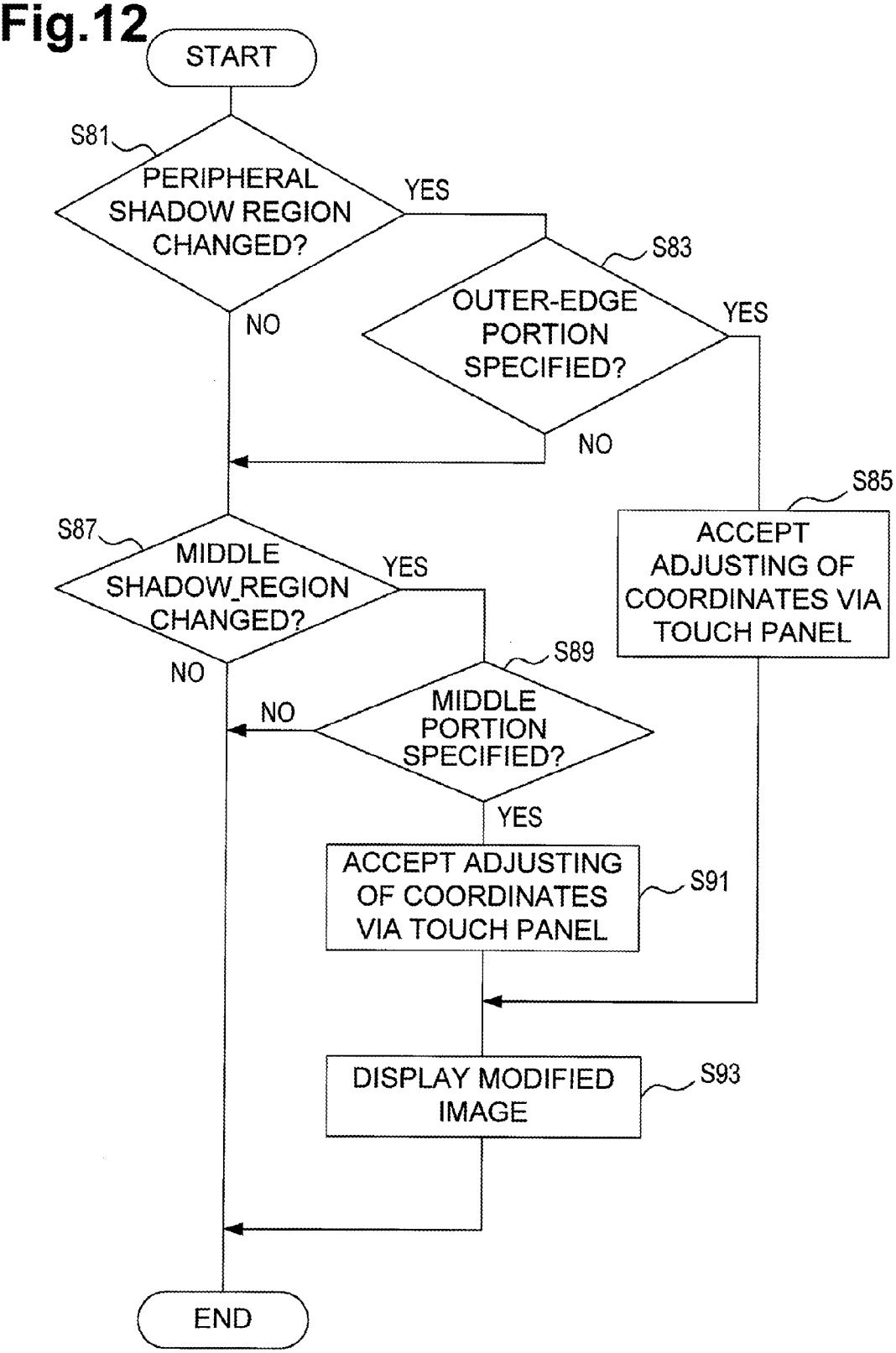

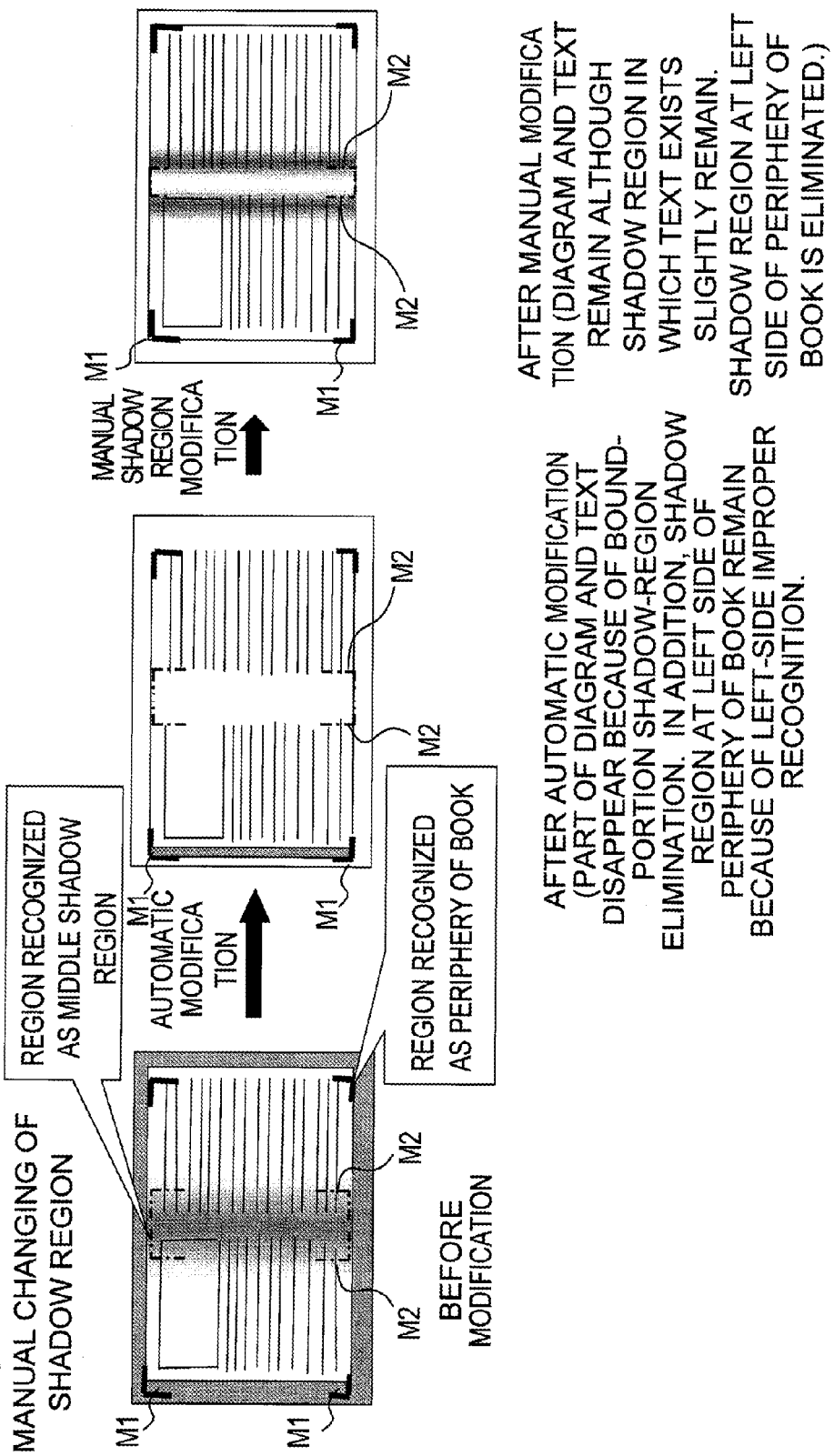

IMAGE PROCESSING APPARATUS

CROSS REFERENCE TO RELATED APPLICATION

This application claims priority from Japanese Patent Application No. 2007-332481, filed on Dec. 25, 2007, the entire subject matter of which is incorporated herein by reference.

BACKGROUND

1. Field of the Invention

Aspects of the present invention relate to an image processing apparatus, and more particularly applied to a copier, an image scanning apparatus, or the like.

2. Description of the Related Art

When a document which is made by binding pieces of paper together (hereinafter such a document being referred to as a book-like document), such as a book or a booklet, is copied, a portion corresponding to the middle (a bound portion) of the book-like document when the book-like document is laid open tends to be darkened on a copy, hereinafter such a portion being referred to as a shadow region.

In the technology disclosed in Japanese Unexamined Patent Application Publication No. 9-284497, when a book-like document is copied, the occurrence of a shadow portion is avoided by specifying the shadow portion, converting the data obtained by scanning the specified portion into binary data according to a gray scale transform table, which is prepared in advance, and simply converting the data obtained by scanning the other portion into binary data without using the gray scale transform table.

However, the shadow region occurring when the book-like document is copied varies in area and in gray-scale level according to the thickness of the book-like document and what pages are to be copied. Thus, when a fixed gray scale transform table is used for such processing, the shadow region may be caused to be of a gray-scale level that is lighter than necessary, whereby a problem may occur in that, for example, text and the like near the shadow region disappear.

Moreover, when a thick book-like document is copied, a dark region (hereinafter, this region is also covered by the term "shadow region") tends to occur at a portion corresponding to a region outside the outer-edge portion of the document. With respect to this shadow region, similarly to the technology disclosed in Japanese Unexamined Patent Application Publication No. 9-284497, if the scanning data is converted into the binary data using a prepared gray scale transform table, there is a high probability that a problem similar to the above-described problem will occur.

SUMMARY

In light of the above-described problems, illustrative aspects of the present invention provide an image processing apparatus configured to eliminate or significantly reduce a shadow region on a copy occurring when a document is scanned.

Illustrative aspects of the invention are directed to an image processing apparatus that includes a scanning unit for scanning a document to obtain scanning data and a control unit. The control unit is configured to specify a shadow region to be modified in the scanning data, execute a first adjusting operation for selecting a gray-scale level of a portion of the scanning data corresponding to the specified shadow region, and modify the scanning data according to the selected gray-scale level.

Other illustrative aspects relate to one or more computer readable media having computer executable instructions stored thereon which, when executed by a processor, perform a method directed to reducing a shadow region generated in the image forming process. The method includes receiving scanning data corresponding to a document which has been scanned, specifying a shadow region to be modified in the scanning data, and selecting a gray-scale level for a portion of the scanning data corresponding to the specified shadow region. In addition, the method may include modifying the scanning data according to the selected gray-scale level, and causing an image based on the modified scanning data to be outputted.

BRIEF DESCRIPTION OF THE DRAWINGS

FIG. 11 is a flowchart showing details of control processing of one of steps shown in FIG. 3 in a second illustrative embodiment of the present invention;

FIG. 12 is a flowchart showing details of an illustrative control process for adjusting a shadow region; and FIG. 13 is a diagram illustrating a feature of book copying in the illustrative second illustrative embodiment of the present invention.

DETAILED DESCRIPTION

A copier to which an image processing apparatus according to the present invention is applied is described in illustrative embodiments according to the present invention. The illustrative embodiments according to the present invention will be described below with reference to the attached drawings.

First Illustrative Embodiment

1. Description of Drawings

Figure 1:
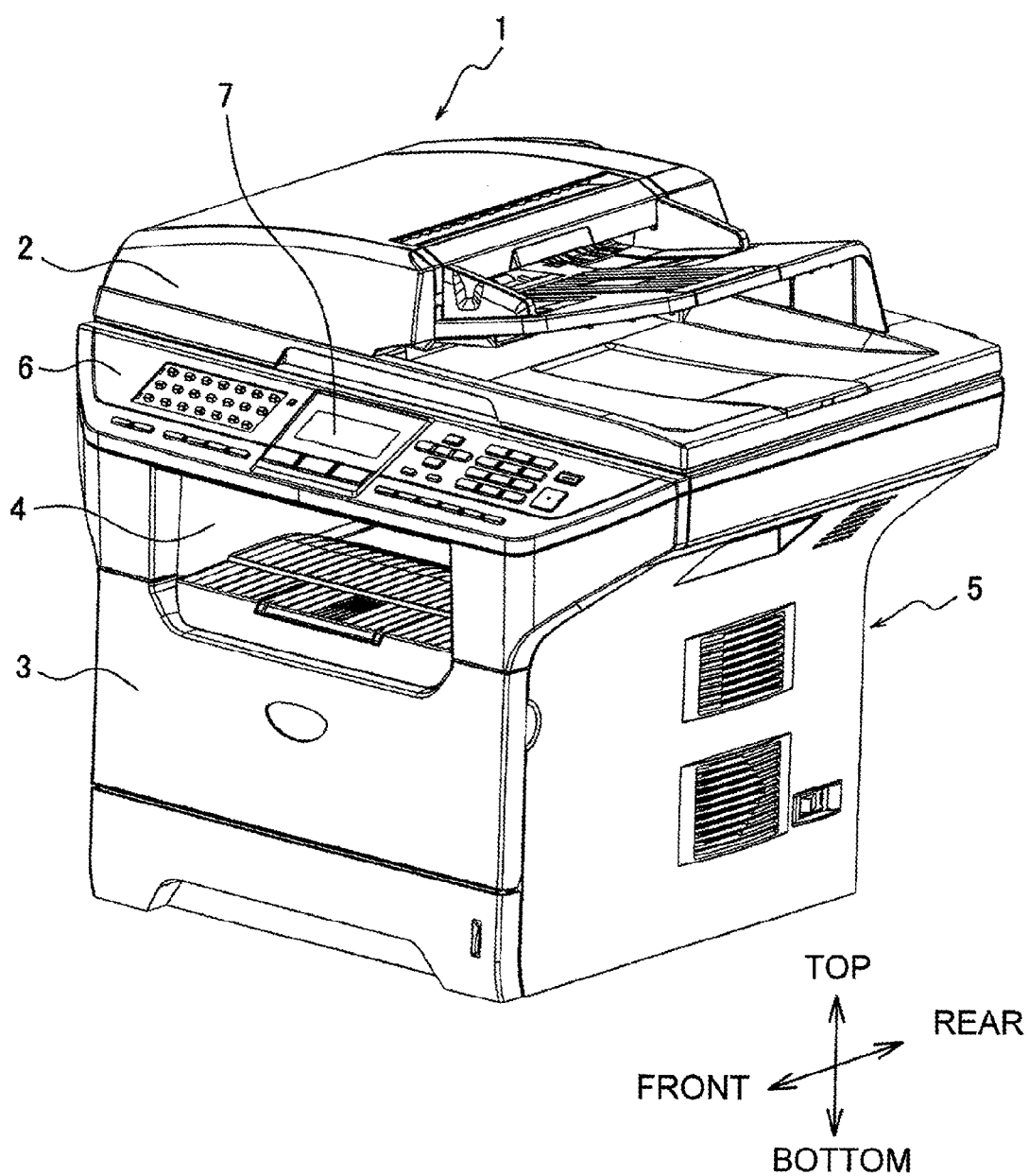
FIG. 1 is a perspective view of a copier according to an illustrative embodiment of the present invention.
Figure 2:
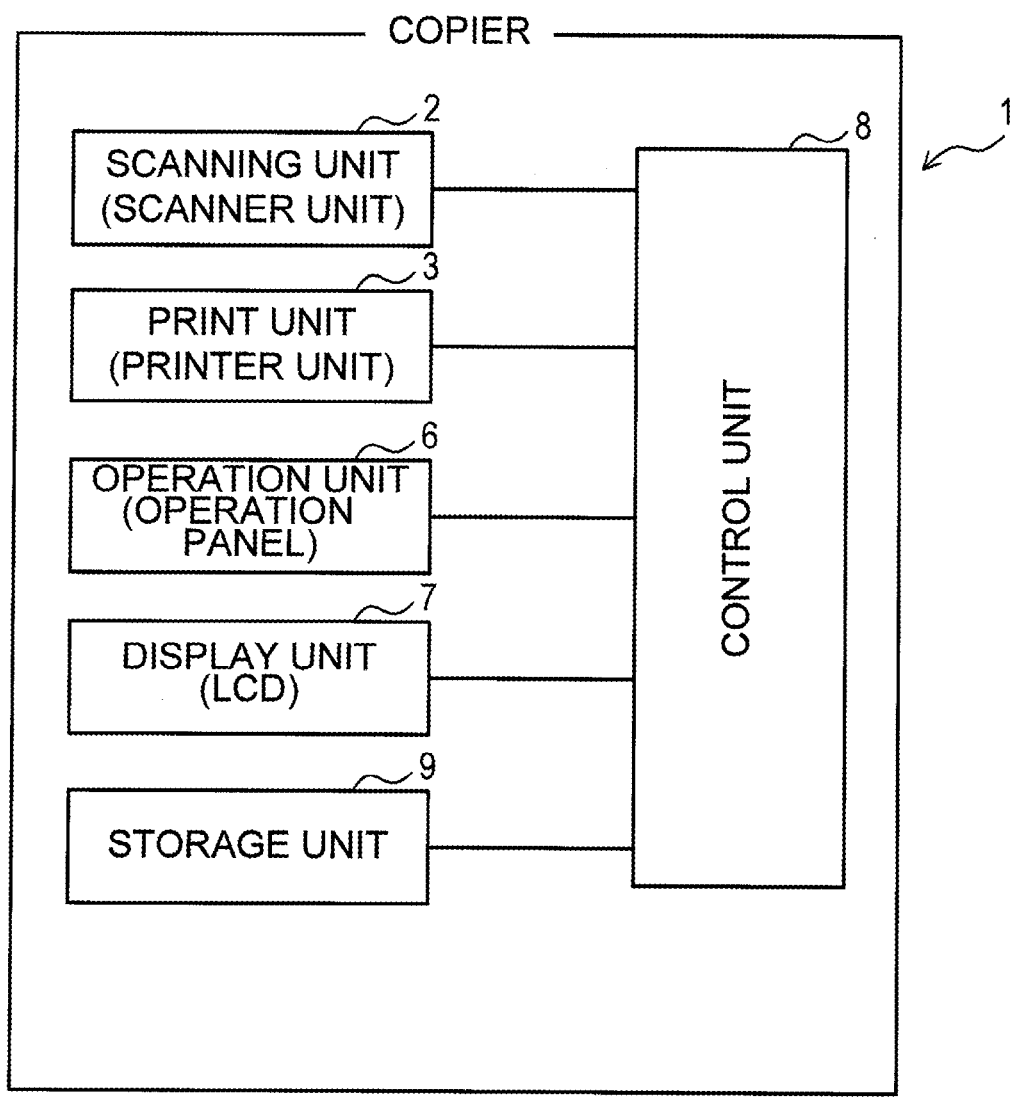
FIG. 2 is a block diagram showing a schematic structure of an electric system of the copier according to the illustrative embodiment of the present invention.
Figure 3:
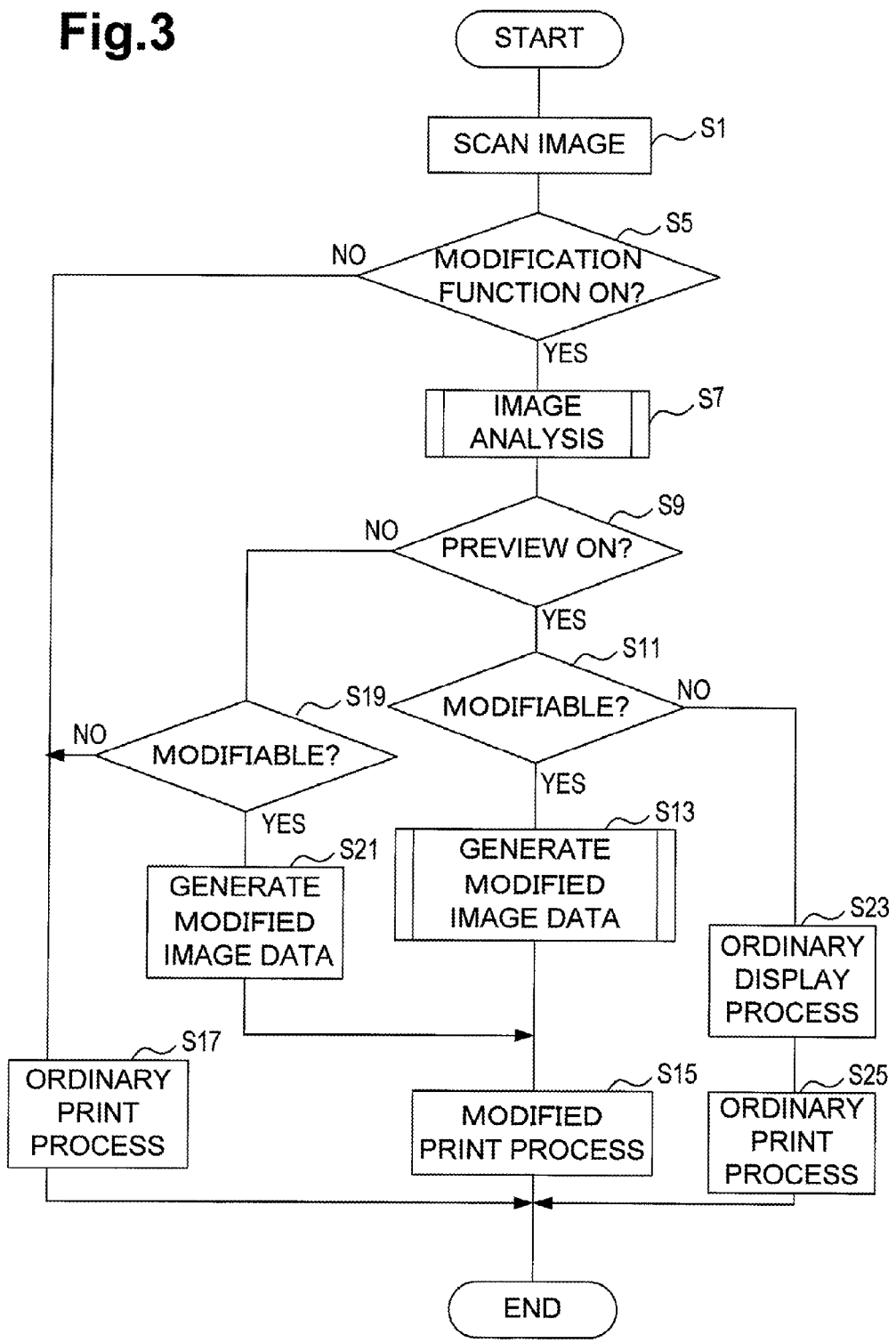
FIG. 3 is a flowchart showing control processing performed when book copying is performed using the copier according to the illustrative embodiment of the present invention.
Figure 4:
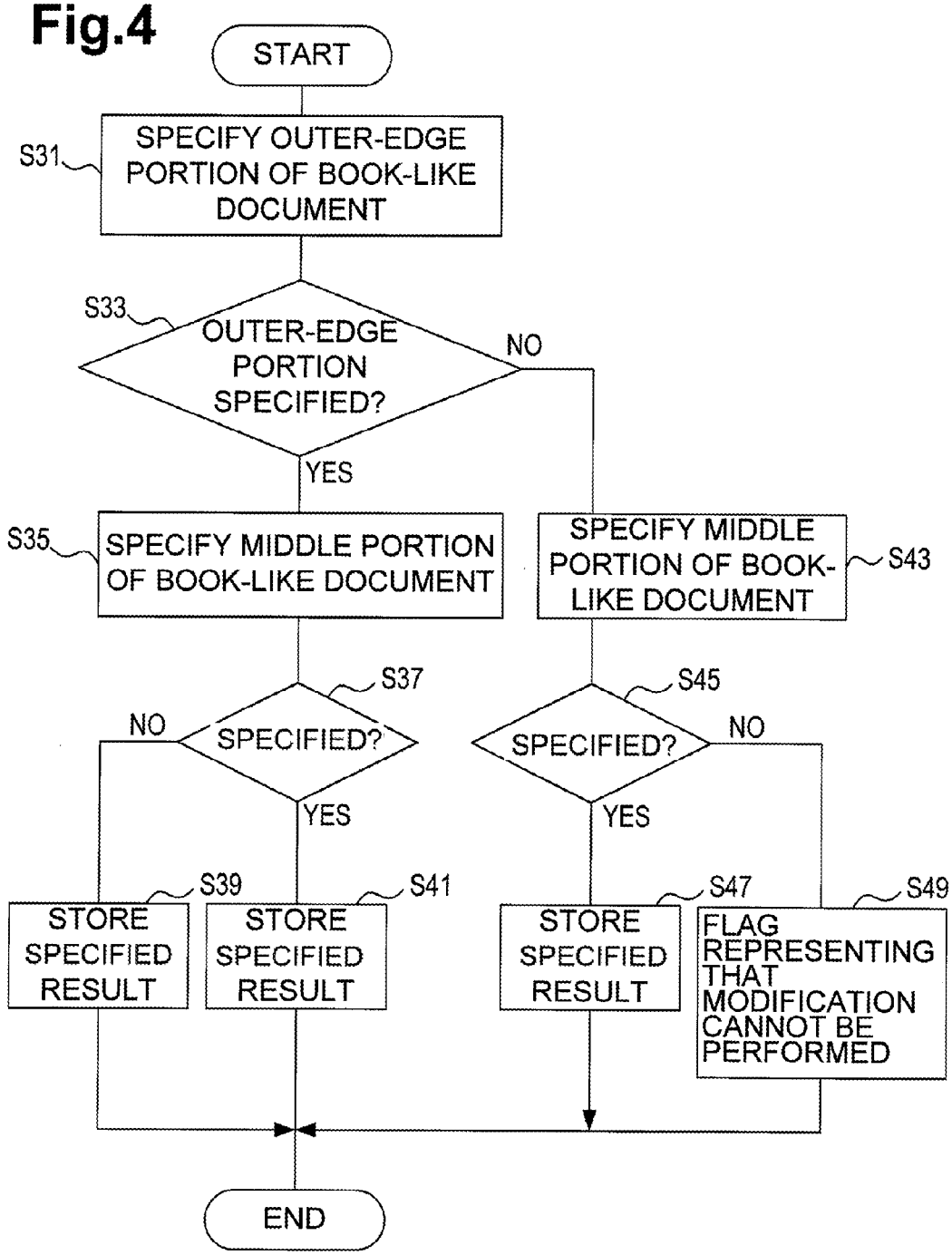
FIG. 4 is a flowchart showing details of one of steps shown in FIG. 3.
Figure 5:
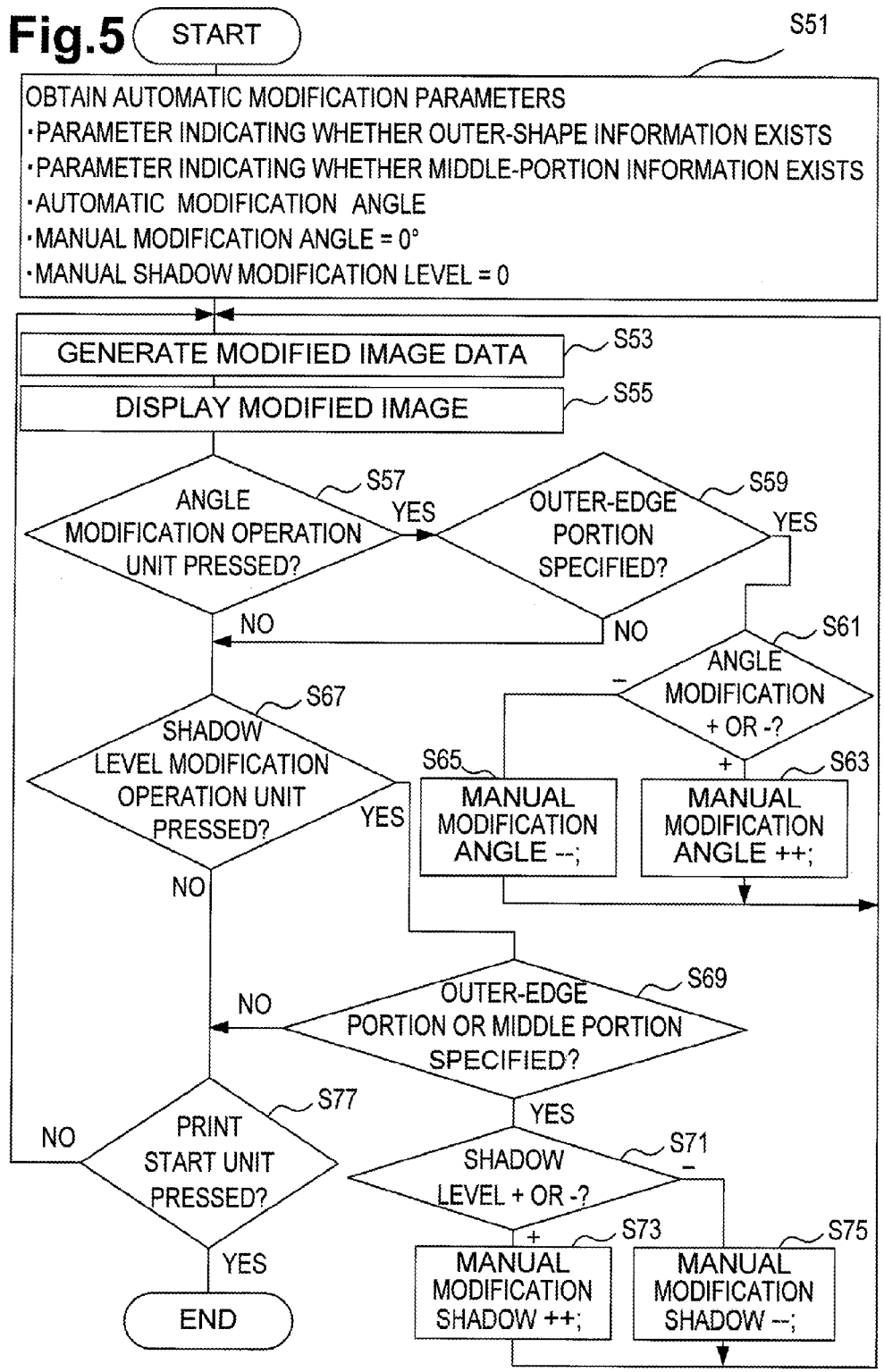
FIG. 5 is a flowchart showing details of one of steps shown in FIG. 3.

FIG. 1 is a perspective view showing a copier 1 according to a first illustrative embodiment. FIG. 2 is a block diagram showing a schematic structure of an electric system of the copier 1. FIG. 3 is a flowchart showing a control process performed when copying a book-like document (hereinafter referred to as book copying) is performed. FIG. 4 is a flowchart showing details of step S7 shown in FIG. 3. FIG. 5 is a flowchart showing details of step S13 shown in FIG. 3.

Figure 6A:
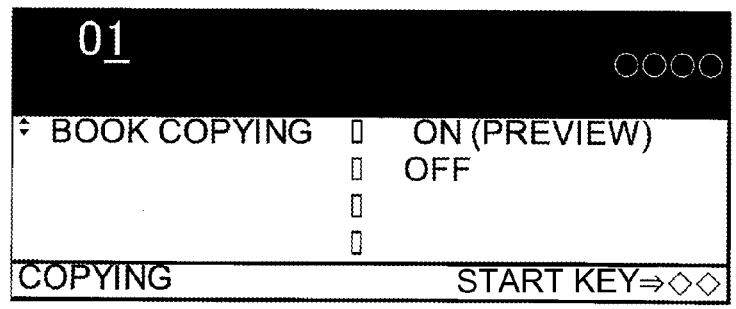
FIGS. 6A through 6C are diagrams showing illustrative graphical user interface display screens displayed on a display unit when a user selects a copier function.
Figure 6B:
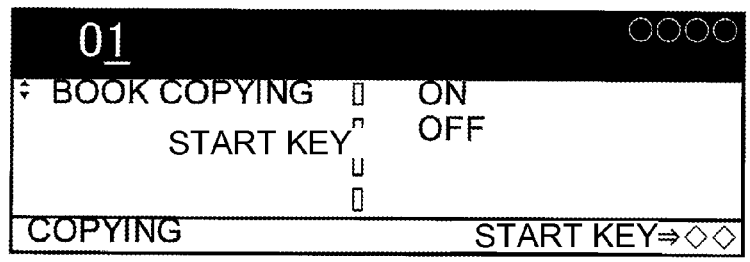
Figure 6C:
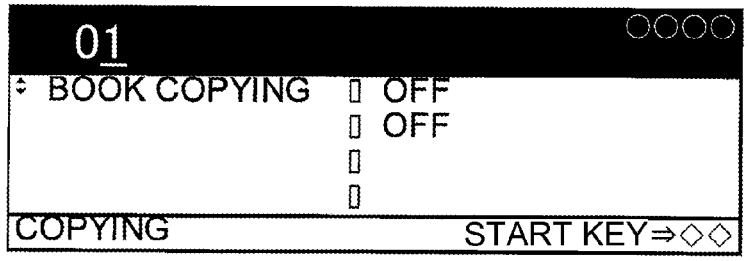
Figure 7:
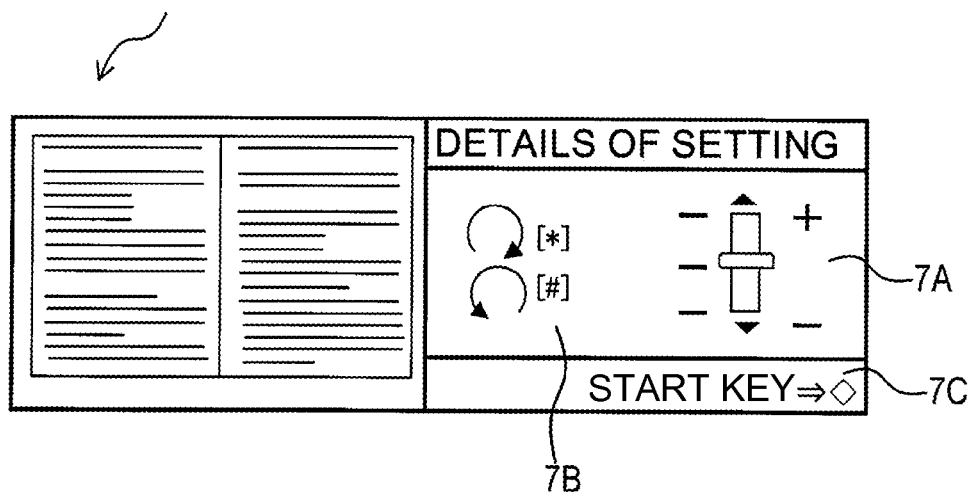
FIG. 7 is a diagram showing an illustrative graphical user interface display screen displayed on the display unit when the manual modification function is operated according to the illustrative embodiment of the present invention.
Figure 8:
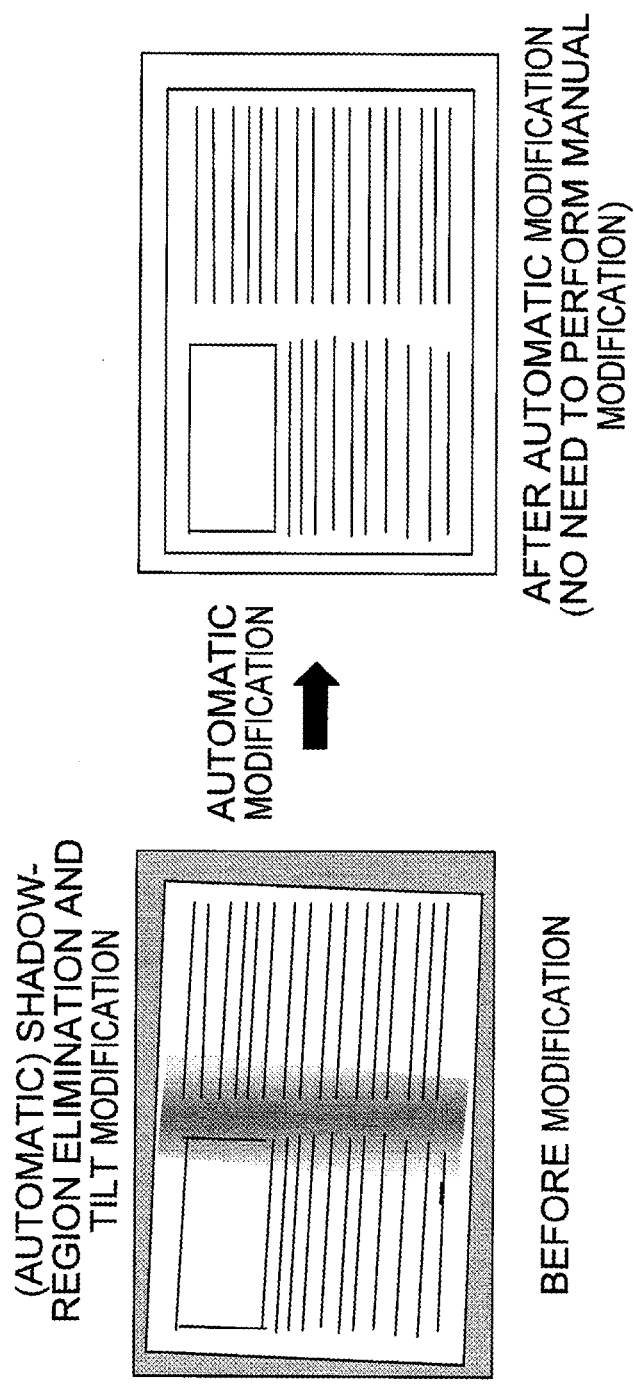
FIG. 8 is a diagram illustrating a feature of book copying in a first illustrative embodiment of the present invention.
Figure 9:
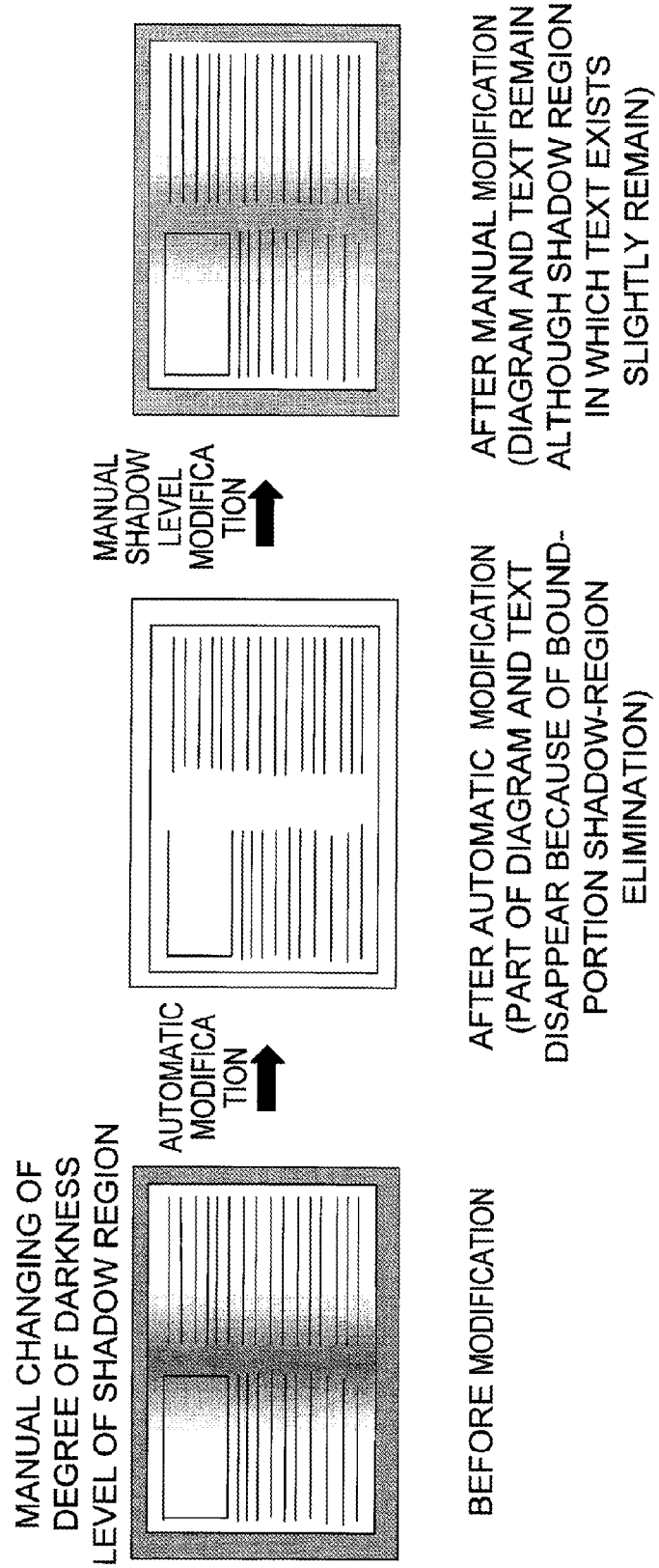
FIG. 9 is a diagram illustrating another feature of the book copying in the first illustrative embodiment of the present invention.
Figure 10:
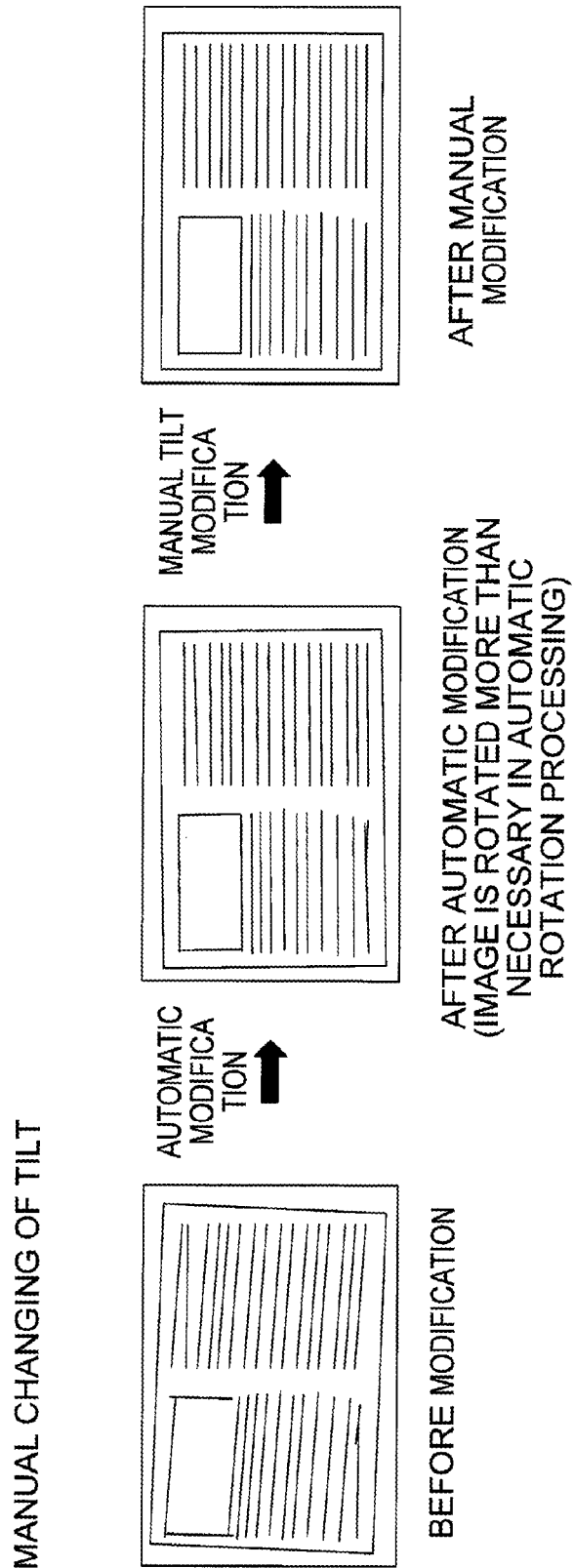
FIG. 10 is a diagram illustrating another feature of the book copying in the first illustrative embodiment of the present invention.

FIGS. 6A through 6C are diagrams showing display screen examples displayed on a display unit 7 when a user makes a selection for a copier function. FIG. 7 is a diagram showing a display screen example displayed on the display unit 7 when a manual modification function is operated. FIGS. 8 through 10 are diagrams to illustrate features of the book copying according to the first illustrative embodiment.

2. Structure of Copier

As shown in FIG. 1, the copier 1 according to the first illustrative embodiment includes a scanning unit 2 for scanning an image (including text) recorded on a document, the scanning unit 2 being provided on the upper portion thereof, a print unit 3 for forming an image on a recording medium such as a recording medium, the print unit 3 being provided at the lower portion of the copier 1, and an output unit 4 to which a printed recording medium or the like is output, the output unit 4 being provided between the scanning unit 2 and the print unit 3.

The print unit 3 according to the first illustrative embodiment can print not only an image represented by scanning data which is obtained by scanning performed by the scanning unit 2 but also an image represented by various data transmitted from a computer (not shown) connected to the copier 1 via a network such as a local area network connected via Ethernet or a wireless network.

An operation panel 6 for accepting a user's input operation and a display unit 7 for displaying various information are provided along one side of the upper portion of a housing 5 in which the scanning unit 2 and the print unit 3 are incorporated. The display unit 7 according to the first illustrative embodiment can be a touch-sensitive display with which it can be determined whether a user has touched the display unit 7 and can detect a position being touched. As such, the display unit 7 also functions as an operation unit for accepting a user's input operation.

As shown in FIG. 2, the scanning unit 2, the print unit 3, the operation panel 6, the display unit 7, and the like are controlled by a control unit 8, which includes a microcomputer having a central processing unit (CPU), a read-only memory (ROM), a random access memory (RAM), and the like. Also, external or removable memory such as a USB memory drive may be connected to a USB port of the microcomputer. Also, the microcomputer may be configured to accommodate other known types of external memory. Computer readable media may include the external memory, ROM and RAM. The computer readable media may contain computer executable instructions executable by the CPU.

Here, for example, a program for controlling the scanning unit 2, the print unit 3, and the like, and a control program (see FIGS. 3 through 5) for performing book copying described below, can be stored in the ROM. These programs can be read from the ROM as necessary and executed by the CPU (the control unit 8). The control unit 8 is configured to execute the various processes discussed below in connection with FIGS. 3, 4, 5, 11 and 12.

A storage unit 9 is configured for storing and holding scanning data which is obtained by scanning performed by the scanning unit 2 and the image data (data to be printed) transmitted from a computer, and the storage unit 9 according to the first illustrative embodiment includes a non-volatile storage device configured to hold stored data even in a case in which power is stopped being supplied.

3. Book Copying Control Processing

3.1. Overview of Book Copying Control Processing

As described above, book copying is copying of a document including bound sheets (a book-like document), such as a book or a booklet. A book copying function is switched to be in an operable state when a user operates the operation panel 6 and selects "ON" for "BOOK COPYING" in a state in which one of copier function selection display screens as shown in FIGS. 6A through 6C is displayed on the display unit 7.

Here, if "ON (PREVIEW)" (see FIG. 6A) is selected by the user as an operation mode for the book copying function, an automatic default modification function and a manual modification function are operable (available) and can be executed. The automatic default modification function is for automatically modifying, according to default parameters, a shadow region appearing on a copy at a portion corresponding to the middle (the bound portion) of the book-like document (hereinafter this shadow region being referred to as a middle shadow region) and a shadow region appearing on the copy at a portion corresponding to a region outside the outer-edge portion of the book-like document (hereinafter this shadow region being referred to as a peripheral shadow region). The manual modification function is for modifying the above-described shadow regions according to user input received via a user input operation.

If "ON" (see FIG. 6B) is selected by the user as the operation mode for the book copying function, only the automatic default modification function is operable in the middle shadow region and the peripheral shadow region, and the manual modification function is not operable (not available). If "OFF" (see FIG. 6C) is selected by the user, neither the automatic default modification function nor the manual modification function is operable (available).

Here, the automatic default modification function can be for lightening a gray-scale level (degree of darkness) of a region regarded as being a shadow region, which is determined in processing described below. Lightening of the gray-scale level occurs by reducing, according to a preset default setting, an amount of ink to be ejected onto or an amount of toner (developer) to be transferred onto a portion of the recording medium (e.g., sheet) corresponding to the shadow region in the scanned image of a document. Thus, the gray-scale level of the shadow region is made to be closer to that of the original color of the recording medium.

The manual modification function is for lightening a gray-scale level (degree of darkness) of the region regarded as the shadow region, by reducing, according to a setting specified by the user via the operation panel 6, an amount of ink to be ejected onto or an amount of toner (developer) to be transferred onto the portion of the recording medium corresponding to the shadow region. Thus, the gray-scale level of the shadow region is made to be closer to the original color of the recording medium.

Here, the above-described "reducing, according to . . . , an amount of ink ejected onto or an amount of toner (developer) transferred onto the portion of the recording medium corresponding to the shadow region" can include a case in which no ink or toner is used.

3.2. Main Control Processing of Book Copying (See FIG. 3)

When a start key (not shown) for executing a scanning function is pressed by a user in a state in which a document to be scanned has been arranged and a user has selected one of the above-described three operation modes, main control processing shown in FIG. 3 is started.

When the main control processing is started, first, in step S1, an image printed on the document is scanned by the scanning unit 2, and the scanning data is stored in the storage unit 9. Thereafter, in step S5, it is determined whether one of the modification functions is available, that is, whether a user has selected "ON (PREVIEW)" or "ON" as the operation mode for the book copying function via a scanning function selection display screen.

Here, if none of the modification functions is available, that is, it has been determined that "OFF" was selected via the scanning function selection display screen ("No" in step S5), in step S17, the scanning data is simply converted into data to be printed without modification and an image represented by the data to be printed is printed by the print unit 3.

If it has been determined that one of the modification functions is available ("YES" in step S5), in step S7, the scanning data is analyzed according to a predetermined procedure (algorithm). Thereafter, in step S9, it is determined whether "ON (PREVIEW)" has been selected via the scanning function selection display screen, that is, whether both the automatic modification function and the manual modification function are set to be in an operable (available) state. The details of step S7 will be described below.

If it has been determined that "ON (PREVIEW)" has not been selected, that is, only the automatic modification function is operable ("No" in step S9), in step S19, it is determined whether at least one of the middle shadow region and the peripheral shadow region can be modified according to an image analysis result obtained in step S7. If it has been determined that neither the middle shadow region nor the peripheral shadow region can be modified ("NO" in step S19), in step S17 the scanning data is converted into data to be printed without modification and the image represented by the data to be printed is printed by the print unit 3, and the main control processing is completed.

Here, the determination as to whether the shadow region can be modification is performed on the basis of whether a flag (described below) that represents that the scanning data cannot be modified is stored in the storage unit 9.

On the other hand, in step S19, if it is determined that at least one of the middle shadow region and the peripheral shadow region can be modified ("YES" in step S19), in step S21 the gray-scale level of at least one of the middle shadow region and the peripheral shadow region in an image represented by the scanning data is modified according to the preset default setting and data to be printed, which will be used when printing is performed, is generated using the modified scanning data. Thereafter, in step S15, an image represented by the data to be printed is printed by the print unit 3, and the main control processing is completed.

In step S9, if it is determined that "ON (PREVIEW)" has been selected, that is, both the automatic default modification function and the manual modification function are operable ("YES" in step S9), in step S11, it is determined whether at least one of the middle shadow region and the peripheral shadow region can be modified according to the image analysis result obtained in step S7. If it has been determined that neither the middle shadow region nor the peripheral shadow region can be modified ("NO" in step S11), in step S23 image data based on the scanning data is generated using the scanning data without requiring modification of the scanning data and an image represented by the generated image data is simply displayed on the display unit 7. Thereafter, in step S25, it is printed by the print unit 3, and the main control processing is completed. Here, the print process in step S25 may be started by detecting and receiving user input (e.g., a user's input command) after the display process in step S23.

On the other hand, if it has been determined that the at least one of the middle shadow region and the peripheral shadow region can be modified ("YES" in step S11), as described below in step S13 an image represented by image data based on the scanning data which has been modified by the automatic default modification function is displayed on the display unit 7, and also the image data based on the modified scanning data is further modified according to the user's input operation. Thereafter, in step S15, data to be printed is generated and an image represented by the data to be printed is printed by the print unit 3, and the main control processing is completed. Here, the print process in step S15 may also be started by detecting and receiving a user's input command.

3.3. Details of Image Analysis Processing (see FIG. 4)

When control for image analysis processing (FIG. 4) is started, first, in step S31, a process for specifying a portion which can be regarded as an outer-edge portion of a book-like document is started. It will be appreciated that the process for specifying will be executed by the control unit 8. After step S31, in step S33, it is determined whether the outer-edge portion of the book-like document has been specified.

Here, in the first illustrative embodiment, gray-scale levels (degrees of darkness) of the image represented by the scanning data are sequentially detected from four edges including a top edge, a bottom edge, a right edge, and a left edge of the image represented by the scanning data output from the scanning unit 2, which scans the document, to the center portion thereof, and a portion within which the gray-scale level significantly changes (a portion in which the degree of darkness of adjacent pixels significantly changes, which has a line-like shape, and which extends continuously) is determined as the outer-edge portion of the book-like document.

That is, if the size of the book-like document is smaller than a scanning area of the scanning unit 2, in ordinary cases, a difference in degree of darkness occurs between a portion in which the book-like document exists and a portion in which the book-like document does not exist in the image represented by the scanning data, whereby this difference in degree of darkness appears as a shadow region in the result of scanning.

Thus, by utilizing this difference in gray-scale level, the outer-edge portion of the book-like document can be specified. In contrast, if the size of the book-like document is larger than the scanning area of the scanning unit 2, the outer-edge portion of the book-like document cannot be specified. Here, by specifying the outer-edge portion, the peripheral shadow region can also be specified, the peripheral shadow region being a shadow region which appears at a portion corresponding to a region outside the outer-edge portion in the scanning data.

If it has been determined that the outer-edge portion of the book-like document was specified ("YES" in step S33), in step S35, a process, executed by the control unit 8, for specifying a portion regarded as the shadow region at the middle portion (the bound portion) of the book-like document is started. After step S35, in step S37, it is determined whether the middle portion of the book-like document has been specified.

In this case, too, similar to the method of specifying the outer-edge portion, gray-scale levels (degrees of darkness) of the image represented by the scanning data are sequentially detected from the edges of the image represented by the scanning data to the center portion thereof, and a portion within which the gray-scale level significantly changes (a portion in which the degree of darkness of adjacent pixels significantly changes, which has a line-like shape, and which extends continuously) near a portion assumed to be the middle portion of the image represented by the scanning data is specified as the middle portion of the book-like document.

That is, in a case in which a book-like document is scanned, since the bound portion of the book-like document is not in contact with the scanning surface of the scanning unit 2, a difference in degree of darkness occurs between a document portion that is in contact with the scanning surface and the portion that is not in contact with the scanning surface in the image represented by the scanning data, and this difference in degree of darkness appears as a shadow region in a result of scanning. Thus, the middle portion of the book-like document can be specified utilizing the gray-scale-level difference.

Moreover, the specified portion exists in a strip-like shape at the middle portion of the image represented by the scanning data, and thus two portions within which the gray-scale level significantly changes are detected. That is, the middle portion is specified by detecting a portion in which the gray-scale level changes from substantially white shade corresponding to the document portion to substantially black shade corresponding to a shadow region and a portion in which, after a certain number of black pixels, the gray-scale level changes from the substantially black shade to the substantially white shade again. Here, if the outer-edge portion has been specified in the image represented by the scanning data, changes in gray-scale level of the scanning data should be detected from the outer-edge portion to the center portion.

Here, if it has been determined that the middle portion was not specified in the image represented by the scanning data of the book-like document ("NO" in step S37), in step S39, the control unit 8 stores only information used to specify the outer-edge portion of the book-like document specified in step S31 (hereinafter referred to as outer-shape information) in the storage unit 9, and thereafter the main control processing is completed.

If it has been determined that the middle portion was specified in the image represented by the scanning data of the book-like document ("YES" in step S37), in step S41, the outer-shape information and information used to specify the middle portion of the book-like document specified in step S35 (hereinafter referred to as middle-portion information) are stored in the storage unit 9, and thereafter the main control processing is completed.

Here, when a point at one corner of the image represented by the scanning data is treated as a data point (0, 0), the outer-shape information and the middle-portion information are constituted by (x, y) coordinate data. As the outer-edge portion of the book-like document, at least pieces of coordinate data corresponding to four vertexes of the book-like document are stored as the outer-shape information. Moreover, the middle portion is generally defined by four sides, and thus pieces of coordinate data corresponding to four vertexes of the middle portion are stored as the middle-portion information.

If, in step S33, it is determined that the outer-edge portion of the book-like document was not specified ("NO" in step S33), in step S43, a process for specifying a portion regarded as the middle portion of the book-like document is started in a manner similar to that in step S35. After step S43 is completed, in step S45, it is determined whether the middle portion of the book-like document has been specified.

Here, if it has been determined that the middle portion of the book-like document was specified ("YES" in step S45), in step S47, the information used to specify the middle portion of the book-like document specified in step S43 (the middle-portion information) is stored in the storage unit 9, and thereafter the main control processing is completed.

On the other hand, if it has been determined that the middle portion of the book-like document was not specified ("NO" in step S45), neither the outer-edge portion nor the middle portion of the book-like document was not specified, and thus, in step S49, a flag (information) representing that the scanning data cannot be modified is stored in the storage unit 9, and thereafter the main control processing is completed.

3.4. Details of Step S13 (see FIG. 5)

In step S13, control processing shown in FIG. 5, which is executed by the control unit 8, is started. When the control processing shown in FIG. 5 is started, first, in step S51, parameters used for performing automatic default modification are read. Thereafter, in step S53, according to these read parameters, at least one of the middle shadow region and the peripheral shadow region of the image represented by the scanning data is modified and image data to be displayed is generated.

Here, in the parameters read in step S51, an "automatic modification angle" is an angle formed between the periphery of a recording medium, which is the recording medium onto which an image represented by data is printed, and the outer-edge portion of the book-like document specified according to the above-described outer-shape information, the data to be printed having been obtained by simply converting the scanning data without requiring modification of the scanning data. In step S53, when the automatic default modification is performed, an image is generated by rotating the image represented by the scanning data by the automatic modification angle in a manner such that the outer-edge portion of the book-like document is caused to be parallel with the periphery of the recording medium.

Moreover, a "manual modification angle" is an angle used to modify the rotation of the image which has been modified by the automatic default modification function, and is an angle specified or selected by a user. A "manual shadow modification level" is a value used to make a change to the gray-scale level (degree of darkness) of regions specified as the middle shadow region and the peripheral shadow region, and is a value specified by the user.

Here, when the manual shadow modification level is 0, it means that the current gray-scale level is maintained without being changed. When the manual shadow modification level is a positive ("+") value, it means that the gray-scale level is made to be darker than the current gray-scale level. When the manual shadow modification level is a negative ("−") value, it means that the gray-scale level is made to be lighter than the current gray-scale level.

When the image on which automatic default modification was performed is generated in step S53, in step S55, a shadow level modification operation unit 7A (see FIG. 7) for inputting a manual shadow modification level and an angle modification operation unit 7B (see FIG. 7) are displayed in addition to the image on which the automatic default modification was performed, and the display unit 7 functions as the operation unit.

Here, the shadow level modification operation unit 7A is an operation unit used to select one of the tone levels representing states ranging from dark to light, according to a user's input operation. The angle modification operation unit 7B is an operation unit used to select, from a plurality of rotation angles set in steps, an appropriate angle by which the image is to be rotated with respect to the periphery of the recording medium, according to a user's input operation. The tone levels and rotation angles are each changed in units of a predetermined amount in accordance with the number of times a corresponding one of the operation units is pressed.

Next, in step S57, it is determined whether the angle modification operation unit 7B has been operated by a user. If it has been determined that the angle modification operation unit 7B was operated by the user ("YES" in step S57), in step S59, it is determined whether the outer-edge portion of the book-like document has been specified, that is, the outer-shape information is stored in the storage unit 9.

Here, if it has been determined that the outer-edge portion of the book-like document has been specified ("YES" in step S59), in step S61, it is determined whether the manual modification angle is positive (clockwise) or negative (counter-clockwise). If it has been determined that the manual modification angle is positive (clockwise) ("+" in step S61), in step S63, a clockwise angle corresponding to the number of times the angle modification operation unit 7B is pressed is input as the manual modification angle. Thereafter, in steps S53 and S55, the image is modified by being rotated using this manual modification angle and displayed on the display unit 7.

On the other hand, if it has been determined that the manual modification angle is negative (counter-clockwise) ("−" in step S61), in step S65, a counter-clockwise angle corresponding to the number of times the angle modification operation unit 7B is pressed is input as the manual modification angle. Thereafter, in steps S53 and S55, the image is modified by being rotated using this manual modification angle and displayed on the display unit 7.

In step S59, if it is determined that the outer-edge portion of the book-like document has not been specified ("NO" in step S59), or, in step S57, if it is determined that the angle modification operation unit 7B has not been operated by the user ("NO" in step S57), in step S67, it is determined whether the shadow level modification operation unit 7A has been operated by the user.

If it has been determined that the shadow level modification operation unit 7A has been operated by the user ("YES" in step S67), in step S69, it is determined whether at least one of the outer-edge portion and the middle portion of the book-like document has been specified, that is, at least one of the outer-shape information and the middle-portion information has been stored in the storage unit 9.

Here, if it has been determined that the outer-edge portion of the book-like document or the like has been specified ("YES" in step S69), in step S71, it is determined whether the shadow level modification operation unit 7A is "+" or "−". If it has been determined that the shadow level modification operation unit 7A is "+" ("+" in step S71), in step S73, a tone level corresponding to the number of times the shadow level modification operation unit 7A is pressed is input as the manual shadow modification level. Thereafter, in steps S73 and S75, the gray-scale level (degree of darkness) of a region specified as the middle shadow region or the like is modified using this manual shadow modification level and a resulting image is displayed on the display unit 7.

On the other hand, if it has been determined that the manual shadow modification level is "−" ("−" in step S61), in step S75, a tone level corresponding to the number of times the shadow level modification operation unit 7A is pressed is input as the manual shadow modification level. Thereafter, in steps S53 and S55, the gray-scale level (degree of darkness) of a region specified as the middle shadow region or the peripheral shadow region is modified using this manual shadow modification level and a resulting image is displayed on the display unit 7.

In step S69, if it is determined that the outer-edge portion of the book-like document or the like has not been specified ("NO" in step S69), or, in step S67, if it is determined that the shadow level modification operation unit 7A has not been operated by the user ("NO" in step S67), in step S77, it is determined whether a start key 7C (see FIG. 7) has been pressed.

If it has been determined that the start key 7C has not been pressed ("NO" in step S77), the process in step S53 is executed again. If it has been determined that the start key 7C has been pressed ("YES" in step S77), the procedure returns to the main control processing (FIG. 3), and, in step S15 (see FIG. 3), the scanning data is modified according to the image currently displayed on the display unit 7, the data to be printed is generated from the modified scanning data and the image represented by the data to be printed is printed by the print unit 3.

4. Features of Copier According to First Illustrative Embodiment

In the first illustrative embodiment, as described above, when "ON" is selected for "BOOK COPYING" by the user, the automatic default modification function is operated without the manual modification function being operated. As shown in FIG. 8, according to the preset default setting, the gray-scale level (degree of darkness) of the middle shadow region and peripheral shadow region of the book-like document in an image represented by the scanning data is automatically adjusted to be lighter in a manner such that the middle shadow region and peripheral shadow region of the book-like document in the image represented by the scanning data are made to be closer to the original color of the recording medium, and thus such shadow regions are made less noticeable.

When "ON (PREVIEW)" is selected for "BOOK COPYING" by the user, as shown in FIGS. 9 and 10, both the manual modification function and the automatic default modification function are operable. First, the gray-scale level of the middle shadow region and peripheral shadow region of the book-like document in the image represented by the scanning data is automatically adjusted to be lighter according to a default gray-scale level, and the skew of the image represented by the scanning data is modified according to the image analysis result. Thereafter, the image data to be displayed is generated based on the modified scanning data, and an image represented by the image data is displayed on the display unit 7.

Here, in an example shown in FIG. 9, since the shadow regions are modified so as to be white by the automatic default modification function, text and the like near the middle portion of the book-like document partially disappear. Moreover, in an example shown in FIG. 10, since an image represented by the scanning data is rotated more than necessary according to an automatic modification angle, the image represented by the scanning data becomes skewed in the opposite direction.

In contrast, when the user operates the shadow level modification operation unit 7A and the angle modification operation unit 7B while viewing the displayed image obtained after the automatic default modification is performed, the image is modified again according to an operated amount of the shadow level modification operation unit 7A and an operated amount of the angle modification operation unit 7B, and an image obtained after the modification is performed is displayed again on the display unit 7. Thus, the user can easily and immediately check a resulting image obtained by performing the manual modification.

Here, in the example shown in FIG. 9, the degree of darkness of the shadow regions is modified to be a little darker by performing the manual modification, and thus the text that has disappeared is displayed. Moreover, in the example shown in FIG. 10, the outer-edge portion of the image data is modified so as to be parallel with the edge of the display unit 7.

Thus, in the first illustrative embodiment, since the gray-scale level of the regions specified as the middle shadow region and peripheral shadow region of the book-like document in the image represented by the scanning data can be modified according to the user's input operation, such shadow regions can be eliminated or significantly reduced so as to satisfy the user's demand.

Moreover, in the first illustrative embodiment, before the user modifies the gray-scale level of the above-described regions by the manual modification function, the gray-scale level thereof is automatically modified according to the preset default setting, and the skew of the image is modified according to the image analysis result. Thus, a burden on the user can be reduced and the usability of the copier 1 can be improved.

Moreover, in the first illustrative embodiment, since an image can be modified by being rotated according to the user's input operation, the user can eliminate or significantly reduce the shadow regions, and also can modify the skew of the image represented by the scanning data which has been obtained by scanning the book-like document in a skewed state.

Moreover, in the first illustrative embodiment, when an image represented by the image data based on the scanning data is displayed on the display unit 7, since the shadow level modification operation unit 7A and the angle modification operation unit 7B are in an operable state, the gray-scale-level modification and the rotation modification of the image represented by the image data with respect to the middle shadow region and peripheral shadow region of the book-like document can be easily performed without requiring performance of an operation of switching a display state of the image data or an operation of switching a modification mode between the shadow level modification and the angle modification.

Moreover, in the first illustrative embodiment, if it has been determined that the gray-scale-level modification of the middle shadow region and peripheral shadow region of the book-like document in the image represented by the scanning data is operable, since the gray-scale-level modification and the rotation modification of the image are both operable with respect to the middle shadow region and peripheral shadow region of the book-like document in the image represented by the scanning data. Thus, the usability of the copier 1 can be improved.

Moreover, since the operation panel 6 and the display unit 7 are provided on the housing 5 in which the scanning unit 2 and the print unit 3 are incorporated, the user can operate the operation panel 6, the shadow level modification operation unit 7A, and the angle modification operation unit 7B while easily viewing an image displayed on the display unit 7. Thus, the usability of the copier 1 can be improved.

When the user performs the shadow level modification or the angle modification on the image displayed on the display unit 7 via the operation panel 6, the image is modified according to an instruction input by the user and the image after being subjected to such modification is displayed again on the display unit 7. Thus, the user can check how the image data reflects the instruction regarding the modification input by the user.

Moreover, when modification processing is completed, the scanning data is modified according to the image obtained after the modification processing is completed, and thus, the scanning data which reflects the user's instruction can be generated.

Second Illustrative Embodiment

In the second illustrative embodiment the size of the middle shadow region which has been automatically specified and the size of the peripheral shadow region which has been automatically specified are changeable according to user input.

That is, FIG. 11 is a flowchart showing details of control processing performed in step S13 (see FIG. 3) in the second illustrative embodiment. The flowchart for the second illustrative embodiment corresponds to the flowchart shown in FIG. 5 for the first illustrative embodiment. As shown in FIG. 11, in the second illustrative embodiment, a control process for adjusting a shadow region (step S56) is added to the flowchart shown in FIG. 5 for the first illustrative embodiment.

In the second illustrative embodiment, when the modified image is displayed in step S55, for example, an image shown in FIG. 13 is displayed. Here, FIG. 13 is a diagram showing the overview of the second illustrative embodiment.

That is, in the above-described process for specifying the outer-edge portion (step S31 in FIG. 4) and the process for specifying the middle portion (steps S35 and S43 in FIG. 4), if the outer-edge portion and middle portion of the book-like document have been specified in the image represented by the scanning data, marks M1 and M2 which are used for identification are additionally displayed on the image displayed on the display unit 7 so that the user can check positions at which the outer-edge portion and middle portion of the book-like document have been specified.

Here, the marks M1 represent the outer-edge portion, and after display data for displaying the marks M1 is generated according to the outer-shape information stored in the storage unit 9, the marks M1 are displayed on the display unit 7.

The marks M2 represent the middle portion, and after display data for displaying the marks M2 is generated according to the middle-portion information stored in the storage unit 9, the marks M2 are displayed on the display unit 7.

FIG. 12 is a flowchart showing details of the control process for adjusting the shadow region (step S56). The control process is started in a state in which an image shown in FIG. 13 is displayed. When this control process is started, first, in step S81, it is determined according to user input whether the peripheral shadow region specified in step S31 (see FIG. 4) is to be changed.

Here, in the second illustrative embodiment, whether the peripheral shadow region is to be changed is determined according to whether a user has identified (e.g., touched, pressed, or otherwise input via voice, keyboard etc.) a portion represented by one of the marks M1 corresponding to the outer-edge portion of an image (the book-like document) displayed on the display unit 7 or identified a portion near one of the marks M1. However, the present invention is not limited thereto.

If it has been detected that the user has identified the outer-edge portion of the image displayed on the display unit 7 and if it has been determined that the peripheral shadow region is to be changed ("YES" in step S81), in step S83, it is determined whether the outer-edge portion of the book-like document has been specified, that is, the outer-shape information is stored in the storage unit 9. Here, if the marks M1 are displayed, the outer-shape information is stored in the storage unit 9, thereby "YES" is selected in step S83 in ordinary cases.

If it has been determined that the outer-edge portion has been specified ("YES" in step S83), in step S85, a portion which the user touches is detected, the portion being on the display unit 7, and the range specified as the peripheral shadow region, the size thereof and the position thereof are changed according to the detection result. Thereafter, in step S93, the changed peripheral shadow region is again displayed on the display unit 7, and the main control processing is completed.

That is, when the user moves his/her finger on the display unit 7 while touching one of the marks M1 with the finger, the mark M1 can be moved while being displayed. Here, since a technology for moving a mark or the like while being displayed according to a finger operation performed on such a display unit 7 is commonly known, a detailed description thereof is omitted. In the second illustrative embodiment, when the finger which has been moving on the display unit 7 is moved away therefrom, the position of the mark M1 is fixed at the last position which the finger touched and the mark M1 is displayed there, and the position of the peripheral shadow region in the image is changed according to the position at which the mark M1 is displayed.

Here, in the example shown in FIG. 13, the marks M1 are displayed at four positions. Since the size of the periphery of the document is fixed, when the mark M1 being displayed at one of the positions is moved, the marks M1 being displayed at the other three positions are moved, while the distances between the four marks M1 are maintained. When the peripheral shadow region in the image data is changed, outer-shape information regarding the changed peripheral shadow region is stored in the storage unit 9.

If it has been determined that the outer-edge portion has not been specified ("NO" in step S83), or that the peripheral shadow region is not to be changed ("NO" in step S81), in step S87, it is determined whether the middle shadow region specified in step S31 (see FIG. 4) is to be changed according to the user's input operation. Here, a case in which the outer-edge portion has not been specified is, for example, a case in which the user identifies a portion near the outer-edge portion of the image on the display unit 7 in a state in which the marks M1 are not displayed.

Here, in the second illustrative embodiment, whether the middle shadow region is to be changed is determined according to whether the user has identified the middle portion of the image displayed on the display unit 7. However, the present invention is not limited thereto.

If it has been determined that the user has identified the middle portion of the image displayed on the display unit 7 and that the middle shadow region is to be changed ("YES" in step S87), in step S89, it is determined whether the middle portion of the book-like document has been specified, that is, whether the middle-portion information is stored in the storage unit 9.

Here, if it has been determined that the middle portion has been specified ("YES" in step S89), in step S91, a portion which the user identifies is detected, the portion being on the display unit 7, and the range specified as the middle shadow region, the size thereof and the position thereof are changed according to the detection result. Thereafter, in step S93, the changed middle shadow region is again displayed on the display unit 7, and the main control processing is completed.

That is, when the user moves his/her finger on the display unit 7 while touching one of the marks M2 representing the middle portion of the image data with the finger, the mark M2 can be moved while being displayed. When the finger which has been moving on the display unit 7 is moved away therefrom, the position of the mark M2 is fixed at the last position which the finger touched and the mark M2 is displayed there, and the position of the middle shadow region in the image (the image represented by the scanning data) is changed according to the position at which the mark M2 is displayed.

Here, in the example shown in FIG. 13, the marks M2 are displayed at four positions. These marks M2 may be separately moved while being displayed or collectively moved while being displayed. When the middle shadow region in the image is changed, middle-portion information regarding the changed middle shadow region is stored in the storage unit 9.

Here, if it has been determined that the middle shadow region is not to be changed ("No" in step S87), the main control processing is completed.

As described above, in the second illustrative embodiment, the size of the middle shadow region and the size of the peripheral shadow region can be changed according to the user's input operation.

That is, in the example shown in FIG. 13, the marks M1 represent a portion different from the actual outer-edge portion of the book-like document on a screen displayed before the automatic default modification is performed, and an unwanted gray-scale-level portion is present or text and the like near the middle portion of the document disappear in the image after the automatic default modification is performed. However, by performing the manual modification, the marks M1 and M2 can be moved as needed while the user checks how the marks M1 and M2 are displayed, and such shadow regions can be eliminated or significantly reduced so as to satisfy the user's desire by modifying the image according to the changed outer-edge portion and the changed middle portion.

Other Illustrative Embodiments

In the above-described illustrative embodiments, if the middle shadow region and the peripheral shadow region cannot be automatically specified, the gray-scale level of such shadow regions cannot be modified, the rotation modification of the image cannot be performed, and the size of such shadow regions cannot be changed. However, the present invention is not limited thereto. If the middle shadow region and the peripheral shadow region cannot be automatically specified, an image based on the scanning data may be displayed on the display unit 7 and the user may manually specify such shadow regions.

Moreover, in the above-described illustrative embodiments, when the manual modification function is in an operable state, the image represented by the image data which has been automatically modified in advance is displayed on the display unit 7. However, the present invention is not limited thereto. The manual modification function and the automatic default modification function may be separately operable.

Moreover, in the above-described illustrative embodiments, the display unit 7 is also used as the operation unit; however, the present invention is not limited thereto.

Moreover, in the above-described illustrative embodiments, the present invention is applied to a copier; however, the present invention is not limited thereto and may, for example, be applied to other image forming apparatuses.

Moreover, a method of specifying the outer-edge portion is not limited to the methods described in the above-described illustrative embodiments.

Moreover, a method of specifying the middle portion is not limited to the methods described in the above-described illustrative embodiments.

Moreover, in the above-described illustrative embodiments, although the image data in which the shadow regions are to be specified and the image data to be displayed are generated using the scanning data obtained by scanning the book-like document by the scanning unit 2, since the data size of the scanning data is large in ordinary cases, if image analysis is performed using the scanning data, it is assumed that a long period of time is required.

Thus, data to be analyzed may be generated by reducing the data size of the scanning data, and the middle shadow region and peripheral shadow region may be specified using this data to be analyzed. Moreover, the data to be analyzed may be utilized as image data to be displayed.

The above-described illustrative embodiments describe that if the "ON (PREVIEW)" has been selected, both the automatic default modification function and the manual modification function are operable. However, rather than performing an automatic default modification function followed by a manual modification function, according to another illustrative aspect of the invention, an automatic modification function may be performed. In this instance, rather than a user selecting the gray scale level, the control unit 8 may perform image analysis of the shadow region and the non-shadow regions and based on the result of the analysis, select an appropriate gray scale level for different portions of the shadow region from among group of gray scale levels stored in memory, for example RAM. The gray scale levels may be stored in a table such that different image analysis results corresponding to a respective gray scale level, which the control unit selects. In another aspect, the manual modification function may be performed after this automatic modification operation is completed.

While several illustrative embodiments of the present invention have been shown and described, it is to be understood that many changes and modifications may be made thereto without departing from the spirit and scope of the invention as defined in the appended claims.

What is claimed is:

1. An image processing apparatus comprising:
   a scanning unit for scanning a document to obtain scanning data; and
   a control unit configured to:
      determine whether one of a first operation mode, a second operation mode, and a third operation mode is selected;
      if one of the first and second operation modes is selected, specify a shadow region to be modified in the scanning data, the specified shadow region corresponding to at least one of a shadow region outside an outer-edge portion of the document and a shadow region which has a strip-like shape and which occurs at a middle portion of the document;
      if the shadow region has been specified and the first operation mode is selected;
         execute a first adjusting operation to modify the scanning data according to a default setting; and
         execute a second adjusting operation for selecting a gray-scale level of a portion of the scanning data corresponding to the specified shadow region based on a user input and modifying the scanning data according to the selected gray-scale level;
      execute a third adjusting operation for selecting a degree of rotation to rotate an image corresponding to the scanning data based on an additional user input;
      output a graphical user interface configured to simultaneously display a first operation unit for receiving the user input used to select the gray-scale level in the second adjusting operation, and a second operation unit for receiving the additional user input used to select the degree of rotation in the third adjusting operation;
      after outputting the graphical user interface, determine whether an angle modification has been received through the second operation unit;
      if determining that the angle modification has been received, determine whether an outer-edge portion of the document has been specified;
      after outputting the graphical user interface, determine whether a shadow modification has been received through the first operation unit; and
      if determining that the shadow modification has been received, determine whether one of an outer-edge portion and a middle portion of the document has been specified;
   if the shadow region has been specified and the second operation mode is selected, execute the first adjusting operation to modify the scanning data according to the default setting;
   output a preview image of the modified scanning data to be displayed if the first operation mode is selected, but not if either of the second and third operation modes is selected; and
   generate print data from the scanning data.

2. The image processing apparatus according to claim 1, further including a display unit for displaying the preview image.

3. The image processing apparatus according to claim 2, further comprising:
   a housing incorporating the scanning unit and the display unit, wherein the first operation unit and the second operation unit are provided on the housing.

4. The image processing apparatus according to claim 1, wherein the control unit is further configured to:
   change a size of the specified shadow region according to another user input.

5. The image processing apparatus according to claim 1, further including a display unit for displaying the preview image representing the scanning data that has been modified in the first adjusting operation before executing the second adjusting operation, and
   wherein in response to the preview image being displayed, the control unit is further configured to receive the user input for selecting the gray-scale level.

6. The image processing apparatus according to claim 5, wherein in the second adjusting operation, the gray-scale level is selected from among one of a plurality of tone levels representing states ranging from dark to light.

7. The image processing apparatus according to claim 1, wherein the control unit is further configured to execute the second adjusting operation after the first adjusting operation.

8. The image processing apparatus according to claim 1, further comprising:
   a print unit configured to print an image represented by the print data on a recording medium, and
   wherein the print data is generated from a modified version of the scanning data.

9. The image processing apparatus according to claim 1, wherein in the second adjusting operation, the gray-scale level is selected from among one of a plurality of tone levels representing states ranging from dark to light.

10. An image processing apparatus comprising:
a scanning unit for scanning a document to obtain scanning data; and
a control unit configured to:
  determine whether one of a first operation mode, a second operation mode, and a third operation mode is selected;
  if one of the first and second operation modes is selected, specify a shadow region to be modified in the scanning data, the specified shadow region corresponding to a shadow region outside an outer-edge portion of the document;
  if the shadow region has been specified and the first operation mode is selected;
    execute a first adjusting operation to modify the scanning data according to a default setting; and execute a second adjusting operation, the second adjusting operation comprising:
      selecting a gray-scale level of a portion of the scanning data corresponding to the specified shadow region based on a user input; and
      modifying the scanning data according to the selected gray-scale level;
    execute a third adjusting operation for selecting a degree of rotation to rotate an image corresponding to the scanning data based on an additional user input;
    output a graphical user interface configured to simultaneously display a first operation unit for receiving the user input used to select the gray-scale level in the second adjusting operation, and a second operation unit for receiving the additional user input used to select the degree of rotation in the third adjusting operation;
    after outputting the graphical user interface, determine whether an angle modification has been received through the second operation unit;
    if determining that the angle modification has been received, determine whether an outer-edge portion of the document has been specified;
    after outputting the graphical user interface, determine whether a shadow modification has been received through the first operation unit; and
    if determining that the shadow modification has been received, determine whether one of an outer-edge portion and a middle portion of the document has been specified;
  if the shadow region has been specified and the second operation mode is selected, execute the first adjusting operation to modify the scanning data according to the default setting;
  output a preview image of the modified scanning data to be displayed if the first operation mode is selected, but not if either of the second and third operation modes is selected; and
  generate print data from the scanning data.

11. The image processing apparatus according to claim 10, further including:
a display unit for displaying the preview image after the first adjusting operation.

12. The image processing apparatus according to claim 10, wherein the control unit is further configured to execute the second adjusting operation after the first adjusting operation.

13. The image processing apparatus according to claim 10, further comprising:
a print unit configured to print an image represented by the print data on a recording medium, and
wherein the print data is generated from a modified version of the scanning data.

14. The image processing apparatus according to claim 1, further comprising:
a print unit configured to print an image represented by the print data on a recording medium,
wherein if the scanning data has been modified according to the gray-scale level selected in the first adjusting operation, the print unit prints print data generated from the modified scanning data.

15. At least one non-transitory computer readable medium having computer executable instructions stored thereon that, when executed by a processor, perform a method comprising steps of:
receiving scanning data corresponding to a document which has been scanned;
determining whether one of a first operation mode, a second operation mode, and a third operation mode is selected;
if one of the first and second operation modes is selected, specifying a shadow region to be modified in the scanning data, the specified shadow region corresponding to at least one of a shadow region outside an outer-edge portion of the document and a shadow region which has a strip-like shape and which occurs at a middle portion of the document;
if the shadow region has been specified and the first operation mode is selected;
  executing a first adjusting operation to modify the scanning data according to a default setting;
  executing a second adjusting operation for selecting a gray-scale level of a portion of the scanning data corresponding to the specified shadow region based on a user input and modifying the scanning data according to the selected gray-scale level;
  executing a third adjusting operation for selecting a degree of rotation to rotate an image corresponding to the scanning data based on an additional user input;
  outputting a graphical user interface configured to simultaneously display a first operation unit for receiving the user input used to select the gray-scale level in the second adjusting operation, and a second operation unit for receiving the additional user input used to select the degree of rotation in the third adjusting operation;
  after outputting the graphical user interface, determining whether an angle modification has been received through the second operation unit;
  if determining that the angle modification has been received, determining whether an outer-edge portion of the document has been specified;
  after outputting the graphical user interface, determining whether a shadow modification has been received through the first operation unit; and
  if determining that the shadow modification has been received, determining whether one of an outer-edge portion and a middle portion of the document has been specified;
if the shadow region has been specified and the second operation mode is selected, executing the first adjusting operation to modify the scanning data according to the default setting;

outputting a preview image of the modified scanning data to be displayed if the first operation mode is selected, but not if either of the second and third operation modes is selected; and generating print data from the scanning data.

16. The at least one non-transitory computer readable medium of claim 15, wherein the method further comprises a step of displaying the preview image based on the scanning data prior to receiving the user input.

17. The at least one non-transitory computer readable medium of claim 15, wherein the method further comprises a step of receiving another user input indicating a selection of one of the first operation mode, the second operation mode, and the third operation mode.

18. The at least one non-transitory computer readable medium of claim 15, wherein the user input includes a selection of the gray-scale level from among one of a plurality of tone levels representing states ranging from dark to light.

19. The at least one non-transitory computer readable medium of claim 15, wherein the method further comprises a step of changing a size of the specified shadow region according to another user input.

20. The at least one non-transitory computer readable medium of claim 15, wherein the method further comprises a step of:
causing an image represented by the print data to be printed on a recording medium.

21. The at least one non-transitory computer readable medium of claim 15, wherein the second adjusting operation is executed after the first adjusting operation.

22. An image processing apparatus comprising:
a scanning unit configured to scan a document to obtain first scanning data;
a display unit configured to display an image based on scanning data; and
a control unit configured to:
determine which one of a first operation mode, a second operation mode, and a third operation mode is set as a preview setting;
if the preview setting is set to one of the first and second operation modes, specify a shadow region to be modified in the first scanning data;
if the shadow region has been specified and the preview setting is set to the first operation mode;
execute a first adjusting operation for adjusting a gray-scale level of a portion of the first scanning data corresponding to the specified shadow region according to a preset default setting to generate second scanning data;
execute a second adjusting operation for selecting a gray-scale level of a portion of the second scanning data based on a user input and modifying the second scanning data according to the selected gray-scale level;
execute a third adjusting operation for selecting a degree of rotation to rotate an image corresponding to the second scanning data based on an additional user input;
output a graphical user interface configured to simultaneously display a first operation unit for receiving the user input used to select the gray-scale level in the second adjusting operation, and a second operation unit for receiving the additional user input used to select the degree of rotation in the third adjusting operation;

after outputting the graphical user interface, determine whether an angle modification has been received through the second operation unit;
if determining that the angle modification has been received, determine whether an outer-edge portion of the document has been specified;
after outputting the graphical user interface, determine whether a shadow modification has been received through the first operation unit; and
if determining that the shadow modification has been received, determine whether one of an outer-edge portion and a middle portion of the document has been specified;
if the shadow region has been specified and the preview setting is set to the second operation mode, execute the first adjusting operation for adjusting the gray-scale level of a portion of the first scanning data corresponding to the specified shadow region according to the preset default setting; and
control the display unit to display a first image based on the second scanning data according to the adjusted gray-scale level if the first operation mode is selected, but not if either of the second and third operation modes is selected.

23. The image processing apparatus according to claim 1, wherein the determining of whether one of the first operation mode, the second operation mode, and the third operation mode is selected is based on a single setting.

24. The image processing apparatus according to claim 1, wherein the control unit is further configured to:
if determining that the angle modification has been received and that an outer-edge portion of the document has not been specified, ignore the angle modification.

25. The image processing apparatus according to claim 1, wherein the control unit is further configured to:
if determining that the shadow modification has been received and that an outer-edge portion and a middle portion of the document have not been specified, ignore the shadow modification.

26. The image processing apparatus according to claim 1, wherein the control unit comprises:
at least one processor; and
memory storing computer-executable instructions that, when executed by the at least one processor, cause the at least one processor to operate as the control unit.

27. The image processing apparatus according to claim 10, wherein the control unit comprises:
at least one processor; and
memory storing computer-executable instructions that, when executed by the at least one processor, cause the at least one processor to operate as the control unit.

28. The at least one non-transitory computer readable medium of claim 15, wherein the method further comprises:
if determining that the angle modification has been received and that an outer-edge portion of the document has not been specified, ignoring the angle modification.

29. The at least one non-transitory computer readable medium of claim 15, wherein the method further comprises:
if determining that the shadow modification has been received and that an outer-edge portion and a middle portion of the document have not been specified, ignoring the shadow modification.

* * * * *